United States Patent [19]
Gupta

[11] Patent Number: 5,610,805
[45] Date of Patent: Mar. 11, 1997

[54] UNINTERRUPTIBLE POWER SUPPLY WITH A BACK-UP BATTERY COUPLED ACROSS THE A.C. INPUT

[75] Inventor: Suresh C. Gupta, Los Alamitos, Calif.

[73] Assignee: Cambridge Continuous Power, Irvine, Calif.

[21] Appl. No.: 370,877

[22] Filed: Jan. 10, 1995

[51] Int. Cl.$^6$ ............................. H02M 5/458; H02J 9/04
[52] U.S. Cl. ................................ 363/37; 307/66
[58] Field of Search ................ 307/64, 66; 323/222; 363/15, 17, 34, 370, 124

[56] References Cited

U.S. PATENT DOCUMENTS

| | | | |
|---|---|---|---|
| 4,366,390 | 12/1982 | Rathmann | 307/66 |
| 4,709,318 | 11/1987 | Gephart et al. | 307/66 |
| 4,719,550 | 1/1988 | Powell et al. | 307/66 |
| 4,788,450 | 11/1988 | Wagner | 307/66 |
| 4,827,151 | 5/1989 | Okado | 323/222 |
| 4,985,819 | 1/1991 | Mori et al. | 307/66 |
| 5,010,469 | 4/1991 | Bobry | 363/37 |
| 5,017,800 | 5/1991 | Divan | 307/66 |
| 5,045,989 | 9/1991 | Higaki et al. | 363/37 |
| 5,119,283 | 6/1992 | Steigerwald et al. | 363/37 |
| 5,126,585 | 6/1992 | Boys | 307/66 |
| 5,241,217 | 8/1993 | Severinsky | 307/64 |
| 5,245,522 | 9/1993 | Kawaguchi et al. | 323/222 |
| 5,408,403 | 4/1995 | Nerone et al. | 323/222 |
| 5,461,301 | 10/1995 | Troung | 323/222 |
| 5,465,011 | 11/1995 | Miller et al. | 307/64 |

FOREIGN PATENT DOCUMENTS

| | | | |
|---|---|---|---|
| 2111326 | 12/1981 | United Kingdom | H02M 54/458 |

OTHER PUBLICATIONS

Green et al., "Hysteresis Current–Forced Three–Phase Voltage–Sourced Reversible Rectifier," IEEE Proceedings, vol. 136, Pt. B., No. 3, May 1989.

Boys et al., "Current–Forced Single–Phase Reversible Rectifier," IEEE Proceedings, vol. 136, Pt. B., No. 5, Sep. 1989.

*Primary Examiner*—Jeffrey L. Sterrett
*Attorney, Agent, or Firm*—Lane, Aitken & McCann

[57] ABSTRACT

A power supply typology in which the pulse width modulated invertor switches serve two functions; conversion of the a.c. input to a d.c. rail voltage in addition to inversion of the d.c. rail voltage to a regulated a.c. output. An a.c. input ground terminal is connected to a node between two of the invertor switches and this node is also connected to the a.c. output to provide a common ground between the a.c. input and the a.c. output. A silicon control rectifier switch and one of the invertor switches connected to the ground node connect the back-up battery to the a.c. source during positive half cycles of the a.c. input in order to maintain a charge on the back-up battery.

3 Claims, 4 Drawing Sheets

UNINTERRUPTIBLE POWER SUPPLY WITH A BACK-UP BATTERY COUPLED ACROSS THE A.C. INPUT

BACKGROUND OF THE INVENTION

1. Field of the Invention

This invention relates to an improved uninterruptible power supply typology, and more particularly to typology that reduces the cost of uninterruptible power supplies.

Uninterruptible power supply circuits are well known and widely used in the prior art. One class of prior art uninterruptible power supplies has a front end stage for converting an a.c. input, such as public utility input, to a d.c. rail voltage. A pulse width modulated invertor converts the rail d.c. voltage to a regulated a.c. output voltage. A normally open switch couples a back-up d.c. supply (e.g. a battery) to the invertor input. In the event the a.c. input fails or falls below a predetermined level, power is supplied on a continuous basis from the back-up battery.

2. Description of the Prior Art

A specific prior art proposal for a universal power supply typology of the class outlined above is disclosed in U.S. Pat. 5,126,585 to Boys. The Boys typology is advantageous in that it provides a high d.c. rail voltage to the pulse width modulated invertor, reducing the current capacity for which the invertor switches must be rated for a given output power. In addition, the Boys typology provides a ground or neutral common to both the a.c. input and the a.c. output. However, the Boys typology is costly to implement due to the number of components it requires.

SUMMARY OF THE INVENTION

One object of this invention is the provision of uninterruptible power supply typology in which certain components, including certain power switches, serve more than one function, reducing cost while providing efficient operation and power factor correction.

Briefly, this invention contemplates the provision of a power supply typology in which the pulse width modulated invertor switches serve two functions; conversion of the a.c. input to a d.c. rail voltage in addition to inversion of the d.c. rail voltage to a regulated a.c. output. An a.c. input ground terminal is connected to a node between two of the invertor switches and this node is also connected to the a.c. output to provide a common ground between the a.c. input and the a.c. output. A silicon control rectifier switch and one of the invertor switches connected to the ground node connect the back-up battery to the a.c. source during positive half cycles of the a.c. input in order to maintain a charge on the back-up battery. If the a.c. power fails, another silicon control rectifier connects the battery to the input of the post chopper to provide an uninterruptible supply of output power.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
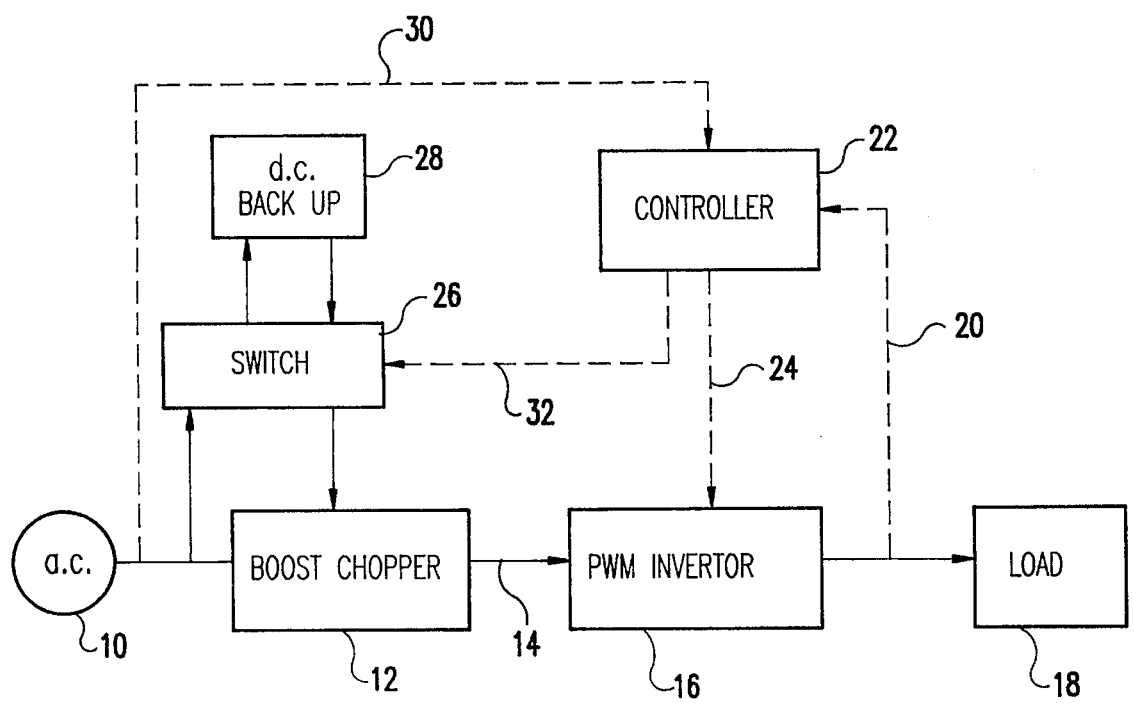
FIG. 1 is a functional block diagram of an uninterruptible power supply in accordance with the teachings of this invention.

Referring now to FIG. 1, an uninterruptible power supply is fed, during normal operation, from an a.c. source 10, such as a 120 volt a.c. public utility line. In FIG. 1 power connections are illustrated by solid lines and signal connections are illustrated by dotted lines. Functionally, the a.c. source 10 is connected to a boost chopper 12, which rectifies the a.c. input and generates a relatively high d.c. voltage between d.c. rails 14 (e.g. over twice the peak a.c. input voltage). A pulse width modulating invertor 16 converts the d.c. rail voltage to a regulated a.c. output voltage, which is coupled to a load 18. Signal line 20 feeds back a signal indicative of the a.c. output voltage to a controller 22 which provides a pulse width modulated switching signal over signal leads 24 to the pulse width modulated invertor switch 16. As will be readily appreciated by those skilled in the art, the pulse width modulated invertor switch 16 may be comprised of semiconductor power switches, such as field effect transistor switches, and the controller 22 may employ any of a number of suitable prior art PWM switching algorithms to provide a constant frequency, voltage regulated power to the load 18.

A switching means 26 couples the a.c. input source 10 to a back-up battery 28. Signal lead 30 provides an input to controller 22 to indicate when the input source fails or drops below a predetermined input voltage. As will be explained in more detail in connection with FIGS. 2, 3, and 4, switching of switching means 26 is synchronized with the pulse width modulated invertor 16 switching during normal operation to connect the back-up battery 28 to the a.c. source 10 during positive half cycles of the a.c. source. Similarly, when the a.c. source fails, the controller operates switching means 26 to connect the back-up battery to the boost chopper 12 so that the d.c. rail voltage is maintained without interruption from the d.c. back-up battery 28.

Figure 2:
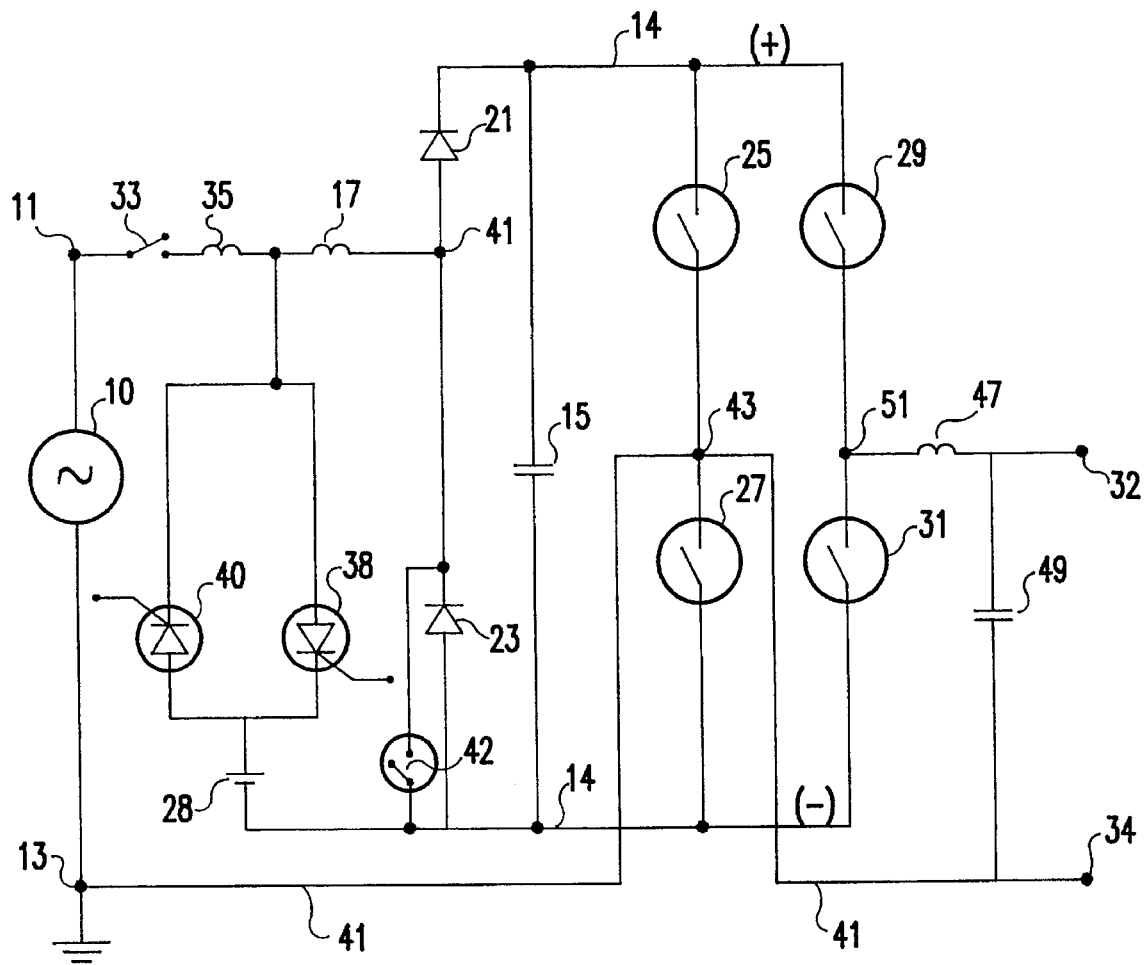
FIG. 2 is a schematic diagram of the uninterruptible power supply shown in block diagram form in FIG. 1.

Referring now to FIG. 2, one side of the single phase a.c. power source 10 is coupled to an input terminal 11 of a universal power supply with a circuit typology in accordance with the teachings of this invention. The other side of the a.c. power source 10 is a ground or neutral terminal 13, which is directly coupled to one output terminal 34 of the universal power supply, providing a common ground or neutral for the input and output. The power source 10 is, for example, a 120 volt single phase public utility source.

The universal power supply has, as its principal components: an a.c. to d.c. boost convertor to establish a relatively high d.c. voltage between d.c. rails 14; a d.c. to a.c. invertor to invert the d.c. rail voltage to controlled a.c. voltage between output terminals 32 and 34; and a back up d.c. power supply 28.

The a.c. to d.c. boost convertor is comprised of a capacitor 15, an inductor 17, diodes 21 and 23, and semiconductor switches 25 and 27. The d.c. to a.c. invertor is comprised of a pair of switches 25 and 27, and switches 29 and 31. A conductor 41 couples a node 43, between switches 25 and 27, to a.c. output terminal 34. Filter inductor 47 and filter capacitor 49 couple a node 51, between switches 29 and 31, to the other a.c. output terminal 32.

A normally closed switch 33 couples the input terminal 11, via a filter inductor 35, to a choke inductor 17 and to a silicon control rectifier 38, which operates during each positive half cycle of the a.c. input in order to maintain the charge of d.c. back-up power source 28. In the event of a drop in the a.c. voltage below a predetermined value, or a failure of the a.c. input, switch 33 opens, isolating the universal power supply and its loads from the a.c. source 10. At the same time switch 33 opens, an input signal to a silicon control rectifier 40 turns it on, coupling one side of the power supply 28 to the inductor 17. A normally open switch 42 is opened and closed during this battery back-up operating mode in order to chop the back-up d.c. supply voltage operating as a forward boost convertor to maintain the d.c. voltage between rails 14.

Figure 3:
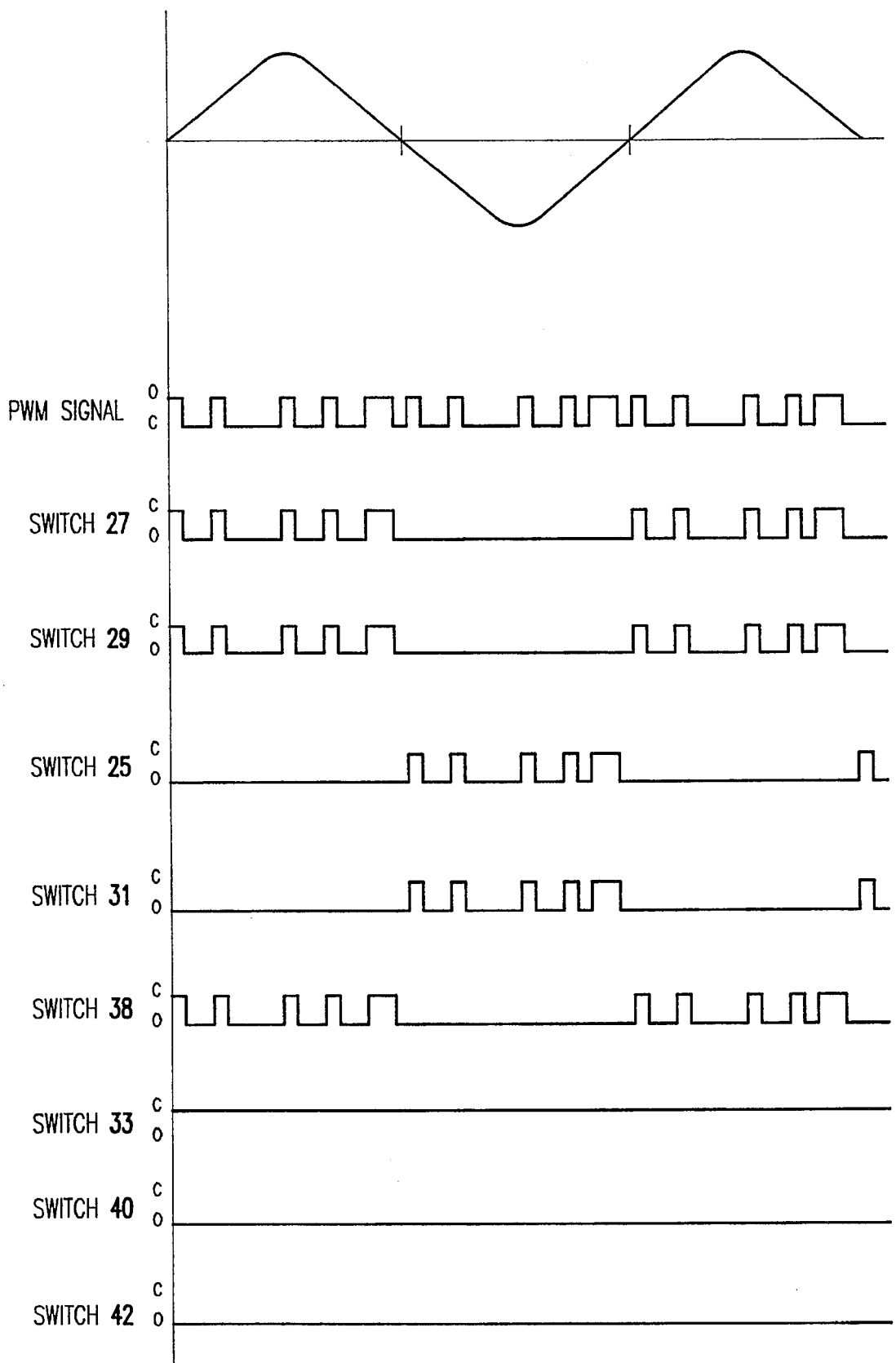
FIG. 3 is a timing diagram illustrating the switching sequence of various switches shown in FIG. 2 during operation of the power supply when fed from the a.c. main, i.e. so called normal operation.

Referring now to FIG. 3 in addition to FIG. 2, it illustrates the sequence of operation of the various switches shown in FIG. 2 during operation when power is drawn from the a.c. power source 10. In this operating mode, the switch 33 is continuously in its closed (i.e. conducting) state and switch 42 is continuously in its open (i.e. nonconducting) state.

As illustrated in FIG. 3, the pulse width modulating control signal from controller 22 opens and closes the switch pair 25–31 in unison for one half cycle of the a.c. output and the switch pairs 27–29 in unison for the other half cycle of the output. As will be appreciated by those skilled in the art, PWM operation provides a fixed frequency, inverted a.c. output whose duty cycle is varied in accordance with the back signal on line 20 to maintain a constant output voltage at terminals 32 and 34. This conventional pulse width modulated invertor mode of operation can be carried out with suitable prior art pulse width modulating control technology executing a suitable prior art pulse width modulating control algorithm. FIG. 3 illustrates a typical pulse width modulating signal, and the resultant states of the invertor switch 25, 27, 29, and 31.

In accordance with the teachings of this invention, switches 25 and 27 serve a dual function; they are part of the pulse width modulating switch, as previously pointed out. In addition, they serve as the capacitor commutating switches for the boost convertor. Switch 27, along with switch 29, operate during the positive half cycle of the input a.c. voltage from source 10, as illustrated in FIG. 3. When switch 27 conducts, a conducting path is initially established, including inductor 17, diode 21, capacitor 15, and switch 27. Similarly, switch 25 operates during the negative half cycle of the a.c. input. When it closes, capacitor 15 is further charged through switch 25 and diode 23. The switches commutate the charging of capacitor 15 so that the d.c. voltage between rails 14 is more than twice the peak a.c. input voltage.

Silicon control rectifier 38 is turned on during the positive half cycle of the input voltage in order to maintain a charge on the back-up power supply 28. As illustrated, SCR 38 is turned on when switch 27 is turned on so that a charging current path is established through the SCR 38, battery 28, and switch 27 to node 43. When switch 27 opens, SCR 38 is commutated off.

Figure 4:
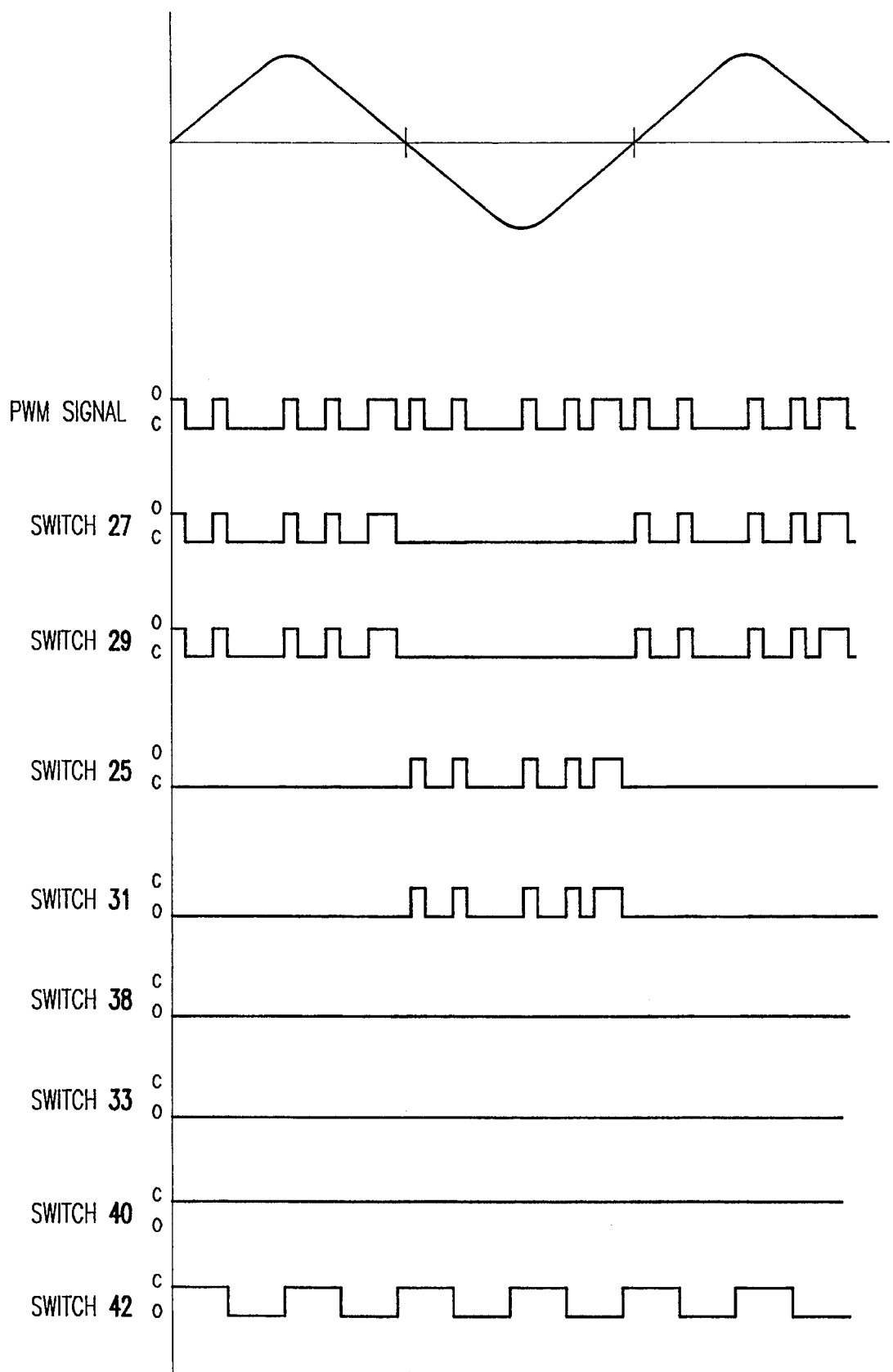
FIG. 4 is a timing diagram, similar to FIG. 3, illustrating the switching sequence during the battery back-up operating mode.

Referring now to FIG. 4, when the power input from a.c. source 10 fails, or falls below a predetermined level, switch 33 opens and stays open, and a silicon controlled rectifier 40 is turned on and stays on. Silicon controlled rectifier 38 remains off during this back-up power mode of operation. Switch 42 switches on and off to chop the back-up d.c. voltage supply 28 required for forward boost d.c. to d.c. convertor operation, maintaining the potential difference between the d.c. rails 14. During this mode of operation, switches 25, 27, 29 and 31 continue to operate as a pulse width modulated d.c. to a.c. invertor switch, maintaining the a.c. output between terminals 32 and 34 at a predetermined voltage.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An uninterruptible power supply, comprising in combination:

a.c. input means including first and second a.c. input terminals and a.c. output means including first and second a.c. output terminals;

first and second d.c. rails;

boost convertor means for converting an a.c. power input coupled to said a.c. input means to a d.c. voltage between said pair of d.c. rails at a d.c. voltage which is higher than the peak voltage of said a.c. power input;

invertor means for inverting said d.c. voltage between said pair of d.c. rails to an a.c. voltage coupled to said a.c. output means;

said invertor means comprised of four switches configured as a bridge between said pair of d.c. rails;

means providing a common connection among a node between two switches in one arm of said bridge, said second a.c. input terminal, and said second a.c. output terminal;

means coupling a node between two switches in the other arm of the bridge to said first a.c. output terminal;

said convertor means comprised of an energy storage inductor connected to said first a.c. input terminal, a capacitor coupled across said pair of d.c. rails, and said two switches in one arm of said bridge;

a chargeable, d.c. back-up power supply;

means to couple said d.c. back-up power supply between said first and second a.c. input terminals during alternate half cycles of said a.c. power input, said means to couple including a first gate controlled rectifier coupling one terminal of said d.c. back-up power supply to said first a.c. input terminal, and one of said two switches in said one arm of said bridge coupling the other terminal of said d.c. back-up power supply to said second a.c. input terminal.

2. An uninterruptible power supply as in claim 1 further including a second gate controlled rectifier for coupling said one terminal of said d.c. back-up power supply as an input to said convertor means in the event of an interruption in said a.c. power input.

3. An uninterruptible power supply as in claim 2 further including a switch for chopping said d.c. back-up power supply when coupled as an input to said convertor means.

* * * * *